May 5, 1964   S. H. BACKSTRÖM   3,132,023
METHOD OF MAGNETIZING REDUCTION OF IRON ORE
Filed March 27, 1961
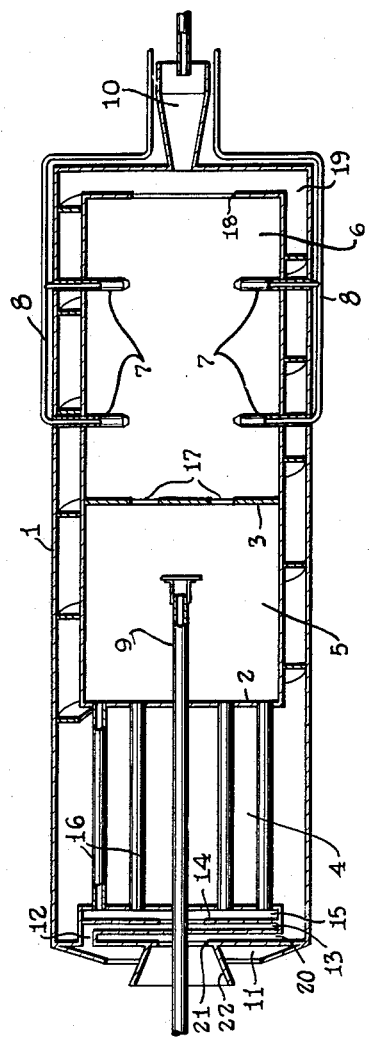

3,132,023
METHOD OF MAGNETIZING REDUCTION
OF IRON ORE
Sven Hjalmar Backström, Borlänge, Sweden, assignor to Stora Kopparbergs Bergslags Aktiebolag, Falun, Sweden, a company of Sweden
Filed Mar. 27, 1961, Ser. No. 98,464
Claims priority, application Sweden Mar. 30, 1960
4 Claims. (Cl. 75—1)

By magnetizing reduction is meant a conversion of hematite ($Fe_2O_3$) present in the iron ore to magnetic oxides, especially $Fe_3O_4$, which makes possible magnetic concentration of the iron ore. It has previously been suggested to carry out such reduction in a rotary furnace in which rubbles or finely ground dressed ore is treated with reducing gases. In doing so the reduction capacity and the temperature of the gas must be carefully adjusted to the character of the ore treated. By insufficient reduction a part of the ore passes through the furnace without becoming reduced to magnetic oxides and therefore passes on to the tailings. If reduction be too strong a part of the ore is converted to FeO which is non-magnetic, or to iron which gives rise to adherence to the walls in the furnace. If a suitable reduction gas is not available this must be produced from solid or liquid fuel. Thus according to a known method the reducing gas may be made from fuel oil by partial combustion in an oil carburetor. Such a device, however, works within a very narrow range in regard of temperature and gas composition.

The object of the present invention is a process for magnetizing reduction with fuel oil in which temperature and gas composition may be sufficiently controlled for the partial reduction to magnetic oxides. The invention is characterized in that the reduction is carried out with fuel oil which is added to the charge in non-combusted form, preferably in liquid form. The oil is gasified in the rotary furnace by the heat of the charge.

According to a preferred embodiment of the invention the liquid oil is added to the hot charge through a pipe or another line, for example, which emerges in the charge, while the amount of oil and charge temperature are adjusted with regard to the type of furnace used and the operation of said furnace so as to obtain the partial reduction aimed at. According to the present invention the oil may also be supplied in such a way that it does not come into contact with the charge until it has been gasified, the oil preferably being gasified by the heat of the charge. The spent reduction gas is burnt (with air) apart from the charge, preferably in a separate preheating chamber, in which it passes counter current to the incoming current of the material to be reduced. Since it is an object of the invention to obtain a good heat economy the reduction is suitably carried out in a rotary furnace having a heat exchanger for the leaving and the entering solid and possibly also for the gaseous materials. Such rotary furnaces are described in Swedish Patent 154,643 and U.S. Patent No. 3,039,753 for example.

Reduction in a rotary furnace having a preheating zone (heat exchanger) for incoming and possibly also for leaving charge is, briefly stated, carried out in the following way. From the inlet the ore is passed through a heat exchanger by tubes, for example, while being preheated by the combustion gases and possibly also by reduced material leaving the reduction zone. Then the ore passes through a preheating chamber in which the ore will be further preheated by the combustion of the reducing waste gases from the reduction zone. For this combustion air is blown through an air pipe into said preheating chamber. The heated ore is then moved into the reduction zone into which fuel oil is sprayed or is introduced into the charge. The oil is either gasified immediately in the hot furnace atmosphere or when it is introduced in the hot charge which is reduced by the products formed from the oil. By controlling the air and oil supplies good reduction may be obtained even of difficultly reducible hematite ores to magnetic oxides. The reduced material is suitably transported out of the reduction zone by a conveyor to said heat exchanger and thence to the outlet.

At the onset heating is obtained by gas combustion or in another way.

According to a modified embodiment a part of the oil is partially gasified in an oil carburetor connected with the furnace while the rest of the oil is introduced into the furnace through a pipe. This second part of the oil is gasified when coming into contact with the hot gases from said oil carburetor and the hot charge. By this embodiment of the invention some advantages are obtained at the starting of a production period.

There may be orifices or short radial pipes through the casing of the furnace communicating with an oil supply line for the addition of oil in liquid form to the charge. By this arrangement the risk of coke depositions in the lines is reduced. The lines may be insulated. This feature may be combined with all the embodiments of the present invention.

The invention will be further illustrated by but is not intended to be limited to the following example, in which a preferred embodiment of the invention is discussed in conjunction with the accompanying schematic drawing.

The drawing is a vertical sectional view substantially in a plane through the longitudinal axis of the rotary furnace.

The furnace consists of the jacket 1 and the interior of the furnace is divided by the walls 2 and 3 into the heat exchanging zone 4, the combustion zone 5 and the reduction zone 6. Zone 6 is provided with a pluraltiy of nozzles 7 through which oil is supplied directly from the pipes 8. Nozzles 7 are distributed not only lengthwise of the zone 6 but also circumferentially. A pipe 9 extends axially through the zone 4 into the zone 5 for supplying air thereto. 10 is a carburetor for introducing partially burned oil into the zone 6 for preheating at the beginning of the furnace operation and for supplying additional heat, if needed during the operation and thus may serve to maintain a uniform temperature in the zone 6 during the furnace operation.

The ore to be treated is introduced into the furnace through the pocket 11 and passes by way of the opening 12, the space 13 and the opening 14 into the feed chamber 15 from which it flows through the pipes 16 of the heat exchanger into the combustion zone 5. The ore then passes through the openings 17 in the wall 3 into the reduction zone 6. In the reduction zone 6 the preheated ore is intimately mixed with the fuel oil injected through the nozzles 7 partly into the body of ore and partly onto and above the surface thereof, respectively by the nozzles that are buried in the ore body and the nozzles that discharge into the open space above the ore body as the furnace rotates. The atmosphere in the zone 6 is thus maintained strongly reducing and the spent reducing gases pass through the openings 17 into the zone 5 where they are burned with air introduced through the pipe 9 and the resulting hot combustion products pass through the pipes 16 in the zone 4 in direct contact with the incoming ore. The ore travels lengthwise through the reducing zone 6 and discharges therefrom through the opening 18 into the helical channel 19 through which it is conveyed back to the space surrounding the pipes 16 in the heat exchanging zone 4. From the zone 4 the ore passes by way of the space 20 and the opening 21 to the discharge funnel 22.

The combustion of the reducing gases with air is according to each embodiment of the present invention carried out outside of the reduction zone in a preheating chamber in direct contact with the incoming ore and the fuel oil is introduced directly to the charge in the reducing zone in liquid form and is gasified in the hot atmosphere of this zone or when coming into contact with the hot charge. A part of the oil may, however, be introduced via an oil carburetor, in which it is partially gasified.

All the embodiments make close control of the reduction capacity and the temperature of the different parts of the charge possible. By controlling the amounts of oil and displacing the oil injection nozzles the temperature and the different parts of the charge may be very closely adjusted. This is not possible if the reducing gas is prepared outside the furnace.

It is preferred to carry out the reduction directly with liquid fuel oil. It is, however, also possible, as mentioned above, especially at the onset of the reduction before the suitable reduction temperature has been obtained to introduce a part of the oil required for the reduction through a carburetor. It might also be suitable in certain cases during the operation to add a part of the oil required via the carburetor in gasified form.

What is claimed is:

1. A process for the reduction of comminuted non-magnetic iron oxide ore to magnetic iron oxide, comprising the steps of passing said ore through a preheating zone in a rotary furnace, passing the resulting preheated ore into a reducing zone defined by a peripheral circumferential surface of said furnace to form during the rotation of the furnace a tumbling hot body of mutually moving particles therein, introducing liquid fuel oil into the interior of said hot body, the oil thereby reducing at least part of said ore to magnetic iron oxide and forming a combustible gas, withdrawing said combustible gas from said hot body and burning it out of contact with said body, introducing the resulting combustion gases into said preheating zone to preheat said ore, passing the hot reduced ore through said preheating zone in heat-exchange relationship with the incoming non-magnetic iron oxide ore to additionally preheat said incoming ore and passing the reduced ore out of the furnace.

2. A process as claimed in claim 1, in which additional liquid fuel oil is injected into said reduction furnace above said body of particles.

3. A process as claimed in claim 1, in which said combustion gases are brought into direct contact with said ore in said preheating zone.

4. A process as claimed in claim 1, in which said liquid fuel oil is introduced into the interior of said hot body through openings in said peripheral circumferential surface.

References Cited in the file of this patent

UNITED STATES PATENTS

| Re. 12,918 | Kendall | Feb. 9, 1909 |
|---|---|---|
| 1,072,753 | McLarty | Sept. 9, 1913 |
| 2,307,997 | Dill | Jan. 12, 1943 |
| 2,384,971 | Silvasy et al. | Sept. 18, 1945 |
| 2,528,552 | Royster | Nov. 7, 1950 |
| 2,829,042 | Moklebust | Apr. 1, 1958 |
| 2,870,003 | Cavanagh | Jan. 20, 1959 |
| 2,900,236 | Speed et al. | Aug. 18, 1959 |